Patented July 22, 1941

2,250,192

UNITED STATES PATENT OFFICE 2,250,192

MANUFACTURE OF EXPANDED RUBBER PRODUCTS

George R. Cuthbertson, Passaic, N. J., assignor to United States Rubber Company, New York, N. Y., a corporation of New Jersey No Drawing. Application April 14, 1939, Serial No. 267,925

7 Claims. (Cl. 260—722)

This invention relates to improvements in the making of gas-expanded rubber products, and more particularly but not exclusively to the making of closed-cell cellular rubber products as distinguished from the sponge or broken cell variety.

Prior art processes of making expanded rubber involving either the use of chemical blowing agents in the rubber and/or the impregnation of the mass of rubber with a gas, generally employ the three steps of partial cure or precure, expansion and final cure of the rubber composition. In both the partial cure and the final cure the vulcanization is effected by means of a single vulcanizing agent, sulphur. In using a partial cure or precure to stiffen the rubber mass the control of the degree of precure is highly critical. Various methods are employed to effect the precure, such as heating in a press, heating in a gassing chamber, or heating in a confining mold. Coupled with any of these, there are two general methods of introducing a gas into the rubber so as to provide a means for subsequent expansion of the rubber: (1) subjecting the rubber to high gas pressures; or (2) mixing into the rubber chemicals which yield gas upon heating. The final curing is carried out after the expansion of the rubber mass.

The success of any cellular rubber process including a precuring step depends considerably upon the degree of the precure. Thus, in order that the expanded rubber may cure without collapse, it must have had sufficient precure to prevent rupture of the cell walls. However, if the rubber is precured too much before expansion, and is ultimately cured only to soft rubber, it will retain stresses which will cause the cured rubber to shrink or collapse. Also, too great a degree of precure will decrease the extent to which the rubber can be expanded. It is seen then that in the usual method of precuring by heating the unexpanded rubber with sulphur, it is difficult to obtain the correct degree of partial vulcanization or precure.

According to the present invention, the previous difficulties are avoided by the use of two vulcanizing agents which act independently of each other and which are active over distinctly different ranges of temperature or which vulcanize at widely different rates. As one vulcanizing agent there is used a non-sulphur organic vulcanizing agent to effect the precure; the quantity of such non-sulphur vulcanizing agent can be adjusted to give the desired degree of precure. The other and slower vulcanizing agent, for subsequently completing the cure, is sulphur. Hence, the invention broadly comprises incorporating into a vulcanizable rubber composition a fast-curing non-sulphur organic vulcanizing agent, and sulphur, together with an accelerator of sulphur vulcanization, heating the mix to effect partial cure thereof by the action of the fast-curing organic vulcanizing agent, the partial cure being carried to an extent sufficient to impart to the rubber mass consistency and strength sufficient to prevent collapse of the mass upon subsequent expansion thereof, gassing the mix, effecting an expansion of the rubber mass, and thereafter heating the expanded mass, with or without further expansion, to complete the vulcanization of the rubber primarily by the action of the sulphur.

A number of non-sulphur organic vulcanizing agents are known, among them being the following types: polynitrobenzenes, organic acid peroxides, halogenated quinones, quinone-monoximes, quinone-dioximes, quinone-monimines, quinone-bis-imines, quinone-mono- and bis-chloroimines. More specifically, 1,3,5-trinitrobenzene, benzoyl peroxide, chloranil, p-benzoquinone-monoxime, p-benzoquinone-dioxime, benzoquinone-monophenylimine, benzoquinone-bis-phenylimine, paraquinone bis-chloroimine.

A non-sulphur vulcanizing agent which has been found particularly useful in the invention is p-benzoquinone dioxime. By the use of this material even relatively thick pieces of rubber may be precured uniformly. Sometimes when the decomposition or the interaction of one or more added chemicals is used to cause the blowing the reaction is exothermic and the heat evolved causes the temperature at the center of the mass to become higher than at the surface. With prior methods of making cellular rubber this would necessarily result in a non-uniform degree of precure. However, vulcanization by benzoquinone dioxime proceeds to the same extent on the surface as in the center, giving to the mass a uniform degree of precure. In place of benzoquinone dioxime, other quinone-oximino compounds may be used, including the metallic salts or other substitution products thereof, particularly those of the quinone dioxime compounds.

The term "rubber" is to be construed broadly as including compounded or uncompounded rubber, reclaimed rubber, rubber derived from naturally-occurring rubber dispersions or from artificially-prepared rubber dispersions.

The following examples are given in illustration of the invention but are not to be considered as limiting thereof, the parts being by weight:

EXAMPLE 1.—One-stage process

A fast curing non-sulphur organic vulcanizing agent and sulphur are incorporated into the rubber mix along with a potential chemical blowing agent; i. e. a chemical or combination of chemicals adapted to decompose or interact when heated to generate a gas. The mix is placed in a mold of such shape and size as to permit the desired expansion and then heated.

The compound is mixed in any suitable manner. The benzoquinone dioxime is conveniently added last preferably on a cool mill. The compound is sheeted or calendered or otherwise formed in the desired size and shape.

| Compound | Soft | Hard |
|---|---|---|
| Rubber (smoked sheet) | 100 | 100 |
| Sulphur | 3 | 3 |
| Spindle oil | 10 | 10 |
| Zinc oxide | 5 | 5 |
| Benzothiazyldisulphide (accelerator) | 1 | 1 |
| Benzoquinone dioxime | 0.8 | 1.5 |
| Added as a paste and milled in — Diethanolamine | 4 | 4 |
| Ammonium chloride | 15 | 15 |
| Sodium nitrite | 15 | 15 |
| Water | 12 | 12 |
| Ammonium hydroxide | 1.5 | 1.5 |
| Bentonite | 35 | 35 |

A mass of the compound is placed in a mold, only partially filling it, then it is heated. The heating may be for 10 minutes at 153° C., or for 10 minutes at 121° C. followed by 15 min. at 148° C., for soft rubber, or other times and temperatures depending upon the thickness and size of the mass and the shape of the mold.

The heating causes, successively, the benzoquinone dioxime to partially vulcanize the rubber, the blowing agent to decompose, and the sulphur to complete vulcanization.

The benzoquinone dioxime vulcanization is very fast and proceeds at such a rate that the compound acquires tensile strength sufficient to prevent the cell walls from rupturing when expansion occurs. The blowing agent appears to decompose between the time the benzoquinone dioxime vulcanization occurs and the time the sulphur vulcanization sets in.

The heating may be arranged to occur more definitely in successive stages so that these three actions are separated. Thus, in 10 min. at 70° C., the benzoquinone dioxime vulcanization is practically complete; in a further 15 min. at 100° C. the blowing agent decomposes and expansion occurs; in a final 15 min. at 140° C. the sulphur vulcanization takes place.

When the mix is one adapted to cure to hard rubber, a two-step heating period is generally used. The first heating causes the benzoquinone dioxime vulcanization and the blowing to take place, and the second heating, at a much higher temperature, causes the sulphur to complete the vulcanization and yields a hard cellular rubber product. After the final heating the expanded mass is preferably cooled before it is removed from the mold although this is not essential.

The mold may be of any type, such as of metal, rubber, or wood, completely or partially closed, or it may consist of a tube through which the rubber is pulled continuously with or without the aid of a fabric carrier, the tube being of such length that over a part of its length it is heated and over the rest cooled. Thus, the raw compound is pulled in one end where it is heated to expand and vulcanize, and is pulled along to the other end where it becomes cooled.

The tendency of the compound is to expand in all three dimensions; this tendency is overcome when restricted by a mold, and one-dimensional, two-, or three-dimensional expansion is obtained depending upon the restriction placed on the mass by the mold which it is to fill.

The aforesaid compounds given as examples will, if permitted, expand approximately twelve-fold.

EXAMPLE 2

A second process comprises incorporating into rubber a fast-curing non-sulphur organic vulcanizing agent, sulphur, and a potential blowing agent, heating the mix while it is confined in a mold so as to prevent expansion of the rubber during the pre-cure, removing the rubber from the mold and subsequently completed the cure.

Compound

| | |
|---|---|
| Smoked sheet | 100 |
| Sulphur | 50 |
| Added as a paste in the mill — Monoethanolamine | 2 |
| Sodium nitrite | 9 |
| Ammonium chloride | 9 |
| Ethylene glycol | 9 |
| Ammonium hydroxide | .9 |
| Bentonite | 25 |
| Benzoquinone dioxime | 1 |

A mass of the compound is placed in a mold, e. g. a ring mold which it substantially fills, then it is heated 20 min. at 108° C. while held between platens of a hydraulic press or other solid confining surfaces. The heating effects partial vulcanization of the rubber by the benzoquinone dioxime, and the generation of nitrogen gas from the reaction of the sodium nitrite and ammonium chloride. The mold and contents are then cooled and the rubber removed from the mold, whereupon the rubber expands to several times its initial volume. The expanded rubber is then cut to shape if necessary, and cured in another mold of the size of the desired article. Further expansion may or may not take place during the final cure.

EXAMPLE 3

A third process comprises incorporating into rubber a fast-curing non-sulphur-containing organic vulcanizing agent, sulphur, and a potential blowing agent, heating the mix while under external gas pressure, thereby causing precuring and gassing, removing the expanded mass from the gassing chamber and subsequently completing the vulcanization by further heating in a mold.

Compound

| | |
|---|---|
| Smoked sheet | 100 |
| Sulphur | 3 |
| Spindle oil | 10 |
| Red oxide | 5 |
| Zinc oxide | 3 |
| Benzothiazyl disulphide | 1 |
| Benzoquinone dioxime | 1 |
| Added as a paste — Sodium nitrite | 12 |
| Ammonium acetate | 17 |
| Water | 6 |
| Bentonite | 35 |

During mixing the stock should be kept cool while milling in the paste containing the blowing agents and the benzoquinone dioxime.

The stock is placed in a bomb or other suitable device for precuring and blowing. Nitrogen or other gas is admitted into the bomb until its pressure is between 50 lbs. and 100 lbs. per sq. in. The bomb is heated for 10 to 15 minutes at 100° to 108° C. During this heating period the blowing agent decomposes and the benzoquinone dioxime precures the rubber. After this precure, the nitrogen is allowed to escape and the expanded rubber taken out of the bomb. It is cut to fit a mold and the final cure carried out in a platen press or by other means. A satisfactory cure is 20 min. at 143° C. This compound and procedure gives a satisfactory product of about 10 to 1 blow.

This process is well adapted to the use of a large autoclave. The temperature during the blowing and precuring step need not be uniform, provided only that the lowest temperature prevailing shall be sufficient to cause the benzoquinone dioxime vulcanization to go to completion and the highest prevailing temperature shall be below the temperature at which the sulphur vulcanization will take place. This results in a uniform precure in all the stock in the chamber.

EXAMPLE 4

A fourth process comprises incorporating a non-sulphur-containing organic vulcanizing agent, and sulphur, in rubber, heating and exposing to external gas in a gassing chamber for precuring and gassing, relieving gas pressure, permitting expansion, and subsequently finally vulcanizing the compound.

*Compound*

| | |
|---|---|
| Smoked sheet | 100 |
| Sulphur | 50 |
| Para-quinone-bis-chloro-imine | 1.5 |

The rubber mix is placed in a gassing chamber and nitrogen or other suitable gas introduced until the pressure is of the order of 500 to 5000 lbs. depending upon the expansion desired. The chamber and contents are heated for 1 hr. to 5 hrs. at 70° C. to 130° C. During this heating period the bis-chloroimine vulcanizes the rubber and the gas dissolves in the rubber. Since the rate of solution of the gas depends upon the temperature, at the higher temperatures the rubber is saturated with the gas in less time than at lower temperatures. The use of the organic vulcanizing agent permits impregnation or gassing at higher temperatures, since the sulphur vulcanization can be retarded by adding to the rubber chemicals such as salicylic acid and the like which are known to retard sulphur vulcanization, but which will not retard vulcanization by the organic vulcanizing agent. The amount of gas dissolved depends upon the pressure, and the expansion obtained depends upon the amount of gas dissolved; hence the final expansion varies according to the pressure used during impregnation.

After the heating period the gas pressure is reduced to atmospheric and the precured, gassed rubber expands.

The expanded rubber can be cured in the chamber or removed from the chamber and cured in molds, in a press, or by other means.

The processes exemplified above yield primarily closed-cell cellular rubber. An illustration of a process which gives primarily a light weight sponge of fine texture is as follows:

EXAMPLE 5

A fast curing non-sulphur organic vulcanizing agent and sulphur are incorporated into the rubber mix along with a potential blowing agent. The mix is placed in a chamber which will permit free expansion and then it is heated.

*Compound*

| | |
|---|---|
| Rubber (smoked sheet) | 100 |
| Sulphur | 3 |
| Spindle oil | 10 |
| Zinc oxide | 5 |
| Benzothiazyl disulphide (accelerator) | 1 |
| Benzoquinone dioxime | 0.8 |
| Ammonium chloride | 15 |
| Sodium nitrite | 15 |
| Water | 12 |
| Diethanolamine | 4 |
| Bentonite | 25 |

A sheet of the rubber mix is talced and placed on a shelf or belt in a chamber. The shelf should be of such size that free expansion can take place. Superheated steam at atmospheric pressure is used to heat the sheet. The steps of precure, blowing and curing can be completed in five minutes at 172° C. Under these conditions a light weight sponge of 6.5-fold blow is obtained. The product has a very fine texture.

It is preferred to use for expanding the rubber those gases, such as nitrogen gas, which have a low diffusivity in the rubber.

It is understood that the invention may be adapted to rubber or rubber-like materials generally including all types of natural rubber, synthetic rubbers like Perbunan, which lend themselves to precure, expansion and cure to form expanded products. Various modifiers which are compatible with the rubber may be included in the rubber compound whereby to reduce the cost of the same.

Having thus described my invention, what I claim and desire to protect by Letters Patent is:

1. A method of making gas-expanded rubber products which comprises incorporating into a vulcanizable rubber composition two different vulcanizing agents each of which is capable of vulcanizing the rubber in different ranges of temperatures or at different rates, one of said vulcanizing agents being a non-sulphur vulcanizing agent selected from the class consisting of polynitro benzenes, organic acid peroxides, halogenated quinones, quinone-oximes, and quinone-imines, and which is more active at lower temperatures of vulcanization than sulphur, the other and less active vulcanizing agent being sulphur, effecting a partial cure primarily with the non-sulphur vulcanizing agent and gas-expanding the rubber mass, and subsequently after gas expansion of the rubber effecting the final cure primarily with the sulphur.

2. A method of making gas-expanded rubber products which comprises precuring a vulcanizable rubber composition with a contained non-sulphur organic vulcanizing agent having a faster curing rate at the precuring temperature than sulphur and selected from the class consisting of polynitrobenzenes, organic acid peroxides, halogenated quinones, quinone-oximes, and quinone-imines, gassing the rubber, and subsequently finally curing the gassed rubber with contained sulphur at a temperature exceeding the said precuring temperature.

3. A method which comprises incorporating into a vulcanizable rubber composition a fast curing non-sulphur organic vulcanizing agent selected from the class consisting of polynitrobenzenes, organic acid peroxides, halogenated quinones, quinone-oximes, and quinone-imines, and sulphur, heating the mix to effect a partial cure by the action of the fast curing organic vulcanizing agent, the partial cure being carried to an extent to provide consistency and tensile strength sufficient to prevent collapse of the mass upon subsequent expansion thereof, gassing the mix, gas-expanding the rubber mass, and thereafter heating the expanded mass to complete the vulcanization of the rubber primarily by the action of the sulphur.

4. A method of making gas-expanded rubber products which comprises incorporating into a vulcanizable rubber composition a quinone-imine curing agent which is more active than sulphur at lower temperatures of vulcanization, and sulphur, effecting a partial cure primarily with the quinone-imine and gas-expanding the rubber mass, and subsequently after gas expansion of the rubber mass effecting a final cure primarily with the sulphur.

5. A method of making gas-expanded rubber products which comprises incorporating into a vulcanizable rubber composition a quinone-oxime curing agent which is more active than sulphur at lower temperatures of vulcanization, and sulphur, effecting a partial cure primarily with the quinone-oxime and gas-expanding the rubber mass, and subsequently after gas expansion of the rubber mass effecting a final cure primarily with the sulphur.

6. A method of making gas-expanded rubber products which comprises incorporating into a vulcanizable rubber composition a quinone-dioxime curing agent which is more active than sulphur at lower temperatures of vulcanization, and sulphur, effecting a partial cure primarily with the quinone-dioxime and gas-expanding the rubber mass, and subsequently after gas expansion of the rubber mass effecting a final cure primarily with the sulphur.

7. A method of making gas-expanded rubber products which comprises incorporating into a vulcanizable rubber composition para-benzoquinone dioxime, and sulphur, effecting a partial cure primarily with the para-benzoquinone dioxime and gas-expanding the rubber mass, and subsequently after gas expansion of the rubber mass effecting a final cure primarily with the sulphur.

GEORGE R. CUTHBERTSON.